(12) United States Patent
Newberry

(10) Patent No.: US 9,729,721 B2
(45) Date of Patent: Aug. 8, 2017

(54) MOBILE DEVICE SYNCHRONIZATION TO A GATEWAY

(71) Applicant: THOMSON LICENSING, Issy les Moulineaux (FR)

(72) Inventor: Thomas Patrick Newberry, Westfield, IN (US)

(73) Assignee: Thomson Licensing (FR)

( * ) Notice: Subject to any disclaimer, the term of this patent is extended or adjusted under 35 U.S.C. 154(b) by 21 days.

(21) Appl. No.: 14/783,486

(22) PCT Filed: May 14, 2013

(86) PCT No.: PCT/US2013/040913
§ 371 (c)(1),
(2) Date: Oct. 9, 2015

(87) PCT Pub. No.: WO2014/185891
PCT Pub. Date: Nov. 20, 2014

(65) Prior Publication Data
US 2016/0072954 A1    Mar. 10, 2016

(51) Int. Cl.
*H04M 3/54*     (2006.01)
*H04M 7/00*     (2006.01)
*H04M 3/42*     (2006.01)

(52) U.S. Cl.
CPC ......... *H04M 3/54* (2013.01); *H04M 3/42263* (2013.01); *H04M 7/0069* (2013.01); *H04M 3/42229* (2013.01); *H04M 2203/1091* (2013.01)

(58) Field of Classification Search
CPC .. H04M 3/54; H04M 3/42263; H04M 7/0069; H04M 3/42229; H04M 2203/1091
See application file for complete search history.

(56) References Cited

U.S. PATENT DOCUMENTS

| 7,715,421 B2* | 5/2010 | Chen ................. | H04M 3/42153 370/432 |
| 7,822,188 B1* | 10/2010 | Kirchhoff ............. | H04M 3/436 379/211.02 |
| 2005/0143054 A1* | 6/2005 | Fogel ...................... | H04M 3/02 455/415 |
| 2007/0185718 A1* | 8/2007 | Di Mambro ............ | G06F 21/32 704/273 |
| 2009/0110175 A1* | 4/2009 | Liu ......................... | H04M 3/54 379/212.01 |
| 2009/0316877 A1* | 12/2009 | Desai ...................... | H04M 3/54 379/212.01 |

(Continued)

FOREIGN PATENT DOCUMENTS

| DE | 10329960 | 3/2005 |
| WO | WO2005041422 | 5/2005 |

*Primary Examiner* — Brian D Nguyen
(74) *Attorney, Agent, or Firm* — Jack Schwartz & Associates, PLLC

(57) ABSTRACT

A gateway 202 identifies mobile devices 210 connected to it. Communication access numbers associated with the mobile devices are then obtained and synchronized with communication access numbers associated with the gateway. The gateway notifies a service provider for the mobile device that its calls should now be routed to the gateway instead of the mobile device. Calls received by the gateway can then be delayed, reformatted and/or otherwise transformed/controlled by the gateway and passed to connected landline devices.

20 Claims, 5 Drawing Sheets

(56) References Cited

U.S. PATENT DOCUMENTS

| | | | |
|---|---|---|---|
| 2010/0158234 A1* | 6/2010 | Vasquez | H04M 3/58 379/212.01 |
| 2012/0230486 A1 | 9/2012 | Guerrero | |
| 2014/0146785 A1* | 5/2014 | Cavgalar | H04L 12/66 370/331 |

* cited by examiner

| COMMUNICATION DEVICE SETUP WITH GATEWAY | | | | | |
|---|---|---|---|---|---|
| ASSOCIATE? | MAC ID | DEVICE NUMBER | GATEWAY NUMBER | TIME | PRIORITY |
| YES | 89:34:A3:9B:22:01 | 609-734-1234 | 317-383-7855 | 1p-2p | A |
| YES | 32:4F:C3:80:11:D2 | 609-734-1235 | 317-383-7856 | | B |
| YES | 56:98:4A:5C:BB:22 | 609-737-1288 | 317-383-7855 | | C |
| NO | 77:6A:E2:4C:E1:02 | 609-737-1222 | | | |

CALL ANSWER OPTIONS ~424
Send lower priority device calls to voicemail if call conflict occurs? ☒
Do not answer lower priority device calls if call conflict occurs? ☐
Move higher priority calls to top of incoming call list? ☐

CONTACT INFORMATION OPTIONS ~426
Automatically transfer device contact information to gateway upon connection? ☒
Automatically transfer contact information associated with device from cloud? ☒
Automatically transfer device contact information to landline devices? ☒

COMMUNICATION DEVICE SETUP OPTIONS ~428
Always prompt me with setup page when a new device is discovered? ☒
Provide advanced options when setup page is first accessed? ☐
Require password protection for transferred call answering? ☒

FIG. 4

MOBILE DEVICE SYNCHRONIZATION TO A GATEWAY

This application claims the benefit, under 35 U.S.C. §365 of International Application PCT/US2013/040913 filed May 14, 2013 which was published in accordance with PCT article 21(2) on Nov. 20, 2014 in English.

BACKGROUND

When at home, consumers often power down their mobile phones and plug them in to charge them—making taking a call problematic. Mainly due to the fact that the mobile phone is now tethered to a power source somewhere in the home and is no longer "mobile." When in this state, calls intended for the mobile phone require the user to seek out the location where the phone is being charged in order to answer the call. This is often very inconvenient to the user.

SUMMARY

By synchronizing mobile devices and landline devices via a gateway (e.g., cable and/or DSL gateway and the like), calls intended for mobile devices can be routed to existing landline devices. Typically, this decreases frustration by the consumer because most homes have several landline devices throughout the home. This gives the consumer more choices in where to answer the call, lessening frustrations.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

BRIEF DESCRIPTION OF THE DRAWINGS

FIG. 4 is an example of a communication device setup webpage from a browser that has accessed a gateway.

DETAILED DESCRIPTION

Figure 1:
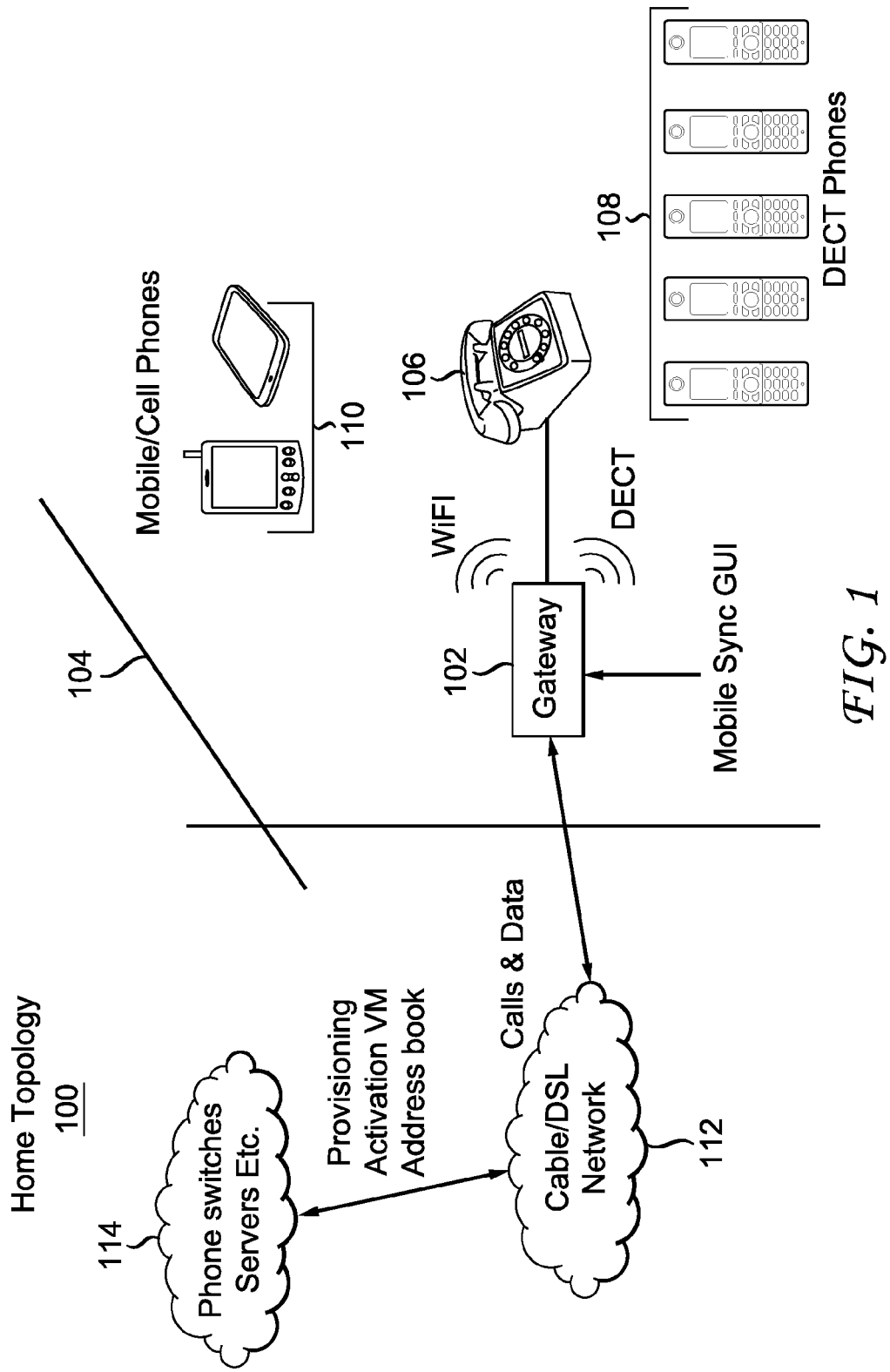
FIG. 1 illustrates an example of a typical home topology of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

The techniques described herein enable a consumer and/or operator to link their mobile device(s) to their cable and/or DSL gateway's voice/landline telephone number. One scenario for such a feature is when someone plugs in their mobile phone to recharge its battery. If a gateway detects a mobile device via a connection such as a wireless signal (e.g., Bluetooth, WiFi, etc.), it can send a message back to the network operator's switch/server. If someone calls the mobile phone, then that call is routed to the gateway's telephone number.

This feature is even more interesting when the landline phone includes Digital Enhanced Cordless Telecommunications (DECT) phones with multiple lines. DECT provides a means for a portable unit, such as a cordless telephone, to access a fixed telecom's network via a radio signal. Connectivity to the fixed network (which may be of many different kinds) is done through a base station. The DECT functionality enables other features such as a network address phone book, name recognition (e.g., displaying a name of someone who is calling on a DECT handset, etc.), voice mail, etc.

FIG. 1 illustrates an example of a typical home topology 100 of an embodiment. A gateway 102 resides in a home 104 to provide communication and/or multimedia services to a home owner. The gateway 102 interfaces with devices in the home 104 such as, for example, a landline device 106 (e.g., a voice over Internet Protocol (VOIP) telephone set), wireless home communication devices 108 (e.g., wireless phones with a base station such as DECT phones and the like) and/or mobile devices 110 (e.g., smart phones, mobile tablets, laptops, etc.) and the like. The gateway 102 provides communications by connecting to a service provider network 112 that can include cable networks, digital subscriber line (DSL) networks and fiber optic networks and the like.

The service provider network 112 can then interact with a communication service provider system 114 to provide enhanced communication services to the home owner/subscriber. One skilled in the art can appreciate that the communication means between the gateway 102, the service provider network 112 and the communication service provider system 114 can be, but is not limited by, wired and/or wireless communications and the like. This can include, but is not limited to, Internet connections, satellite connections, cable connections, fiber optic connections and/or other wireless connections such as cellular, wide area network connections, local area network connections, WiFi connections and/or Bluetooth connections and the like.

Figure 2:
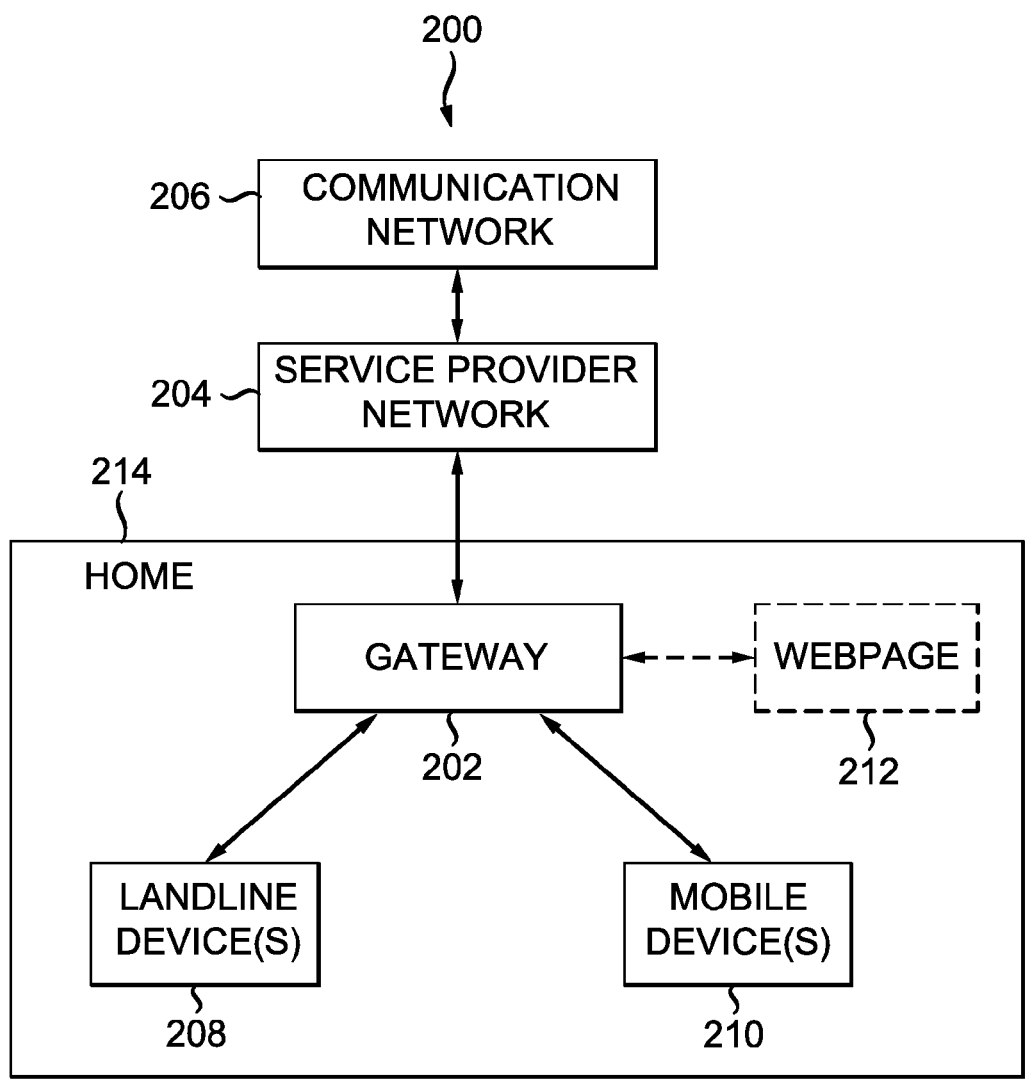
FIG. 2 is an example of a communication system that includes a gateway device.

In FIG. 2, an example of a communication system 200 that includes a gateway device 202 is illustrated. The gateway device 202 in this example resides within a home 214. It 202 interfaces with landline device(s) 208 and mobile device(s) 210. In some examples, a webpage 212 such as a hypertext markup language (HTML) page shown on a browser can be used to interface with the gateway 202. The gateway device 202 interfaces with a service provider network 204 to communicate with external sources. The service provider network 204 is then linked to a communication network 206 such as a cellular provider's network and the like. The gateway device 202 communicates via wired and/or wireless means to devices such as the landline device(s) 208 and the mobile device(s) 210. The landline device(s) 208 are typically connected to the gateway device 202 via a wired connection. However, the landline device(s) 208 can include landlines with a wireless base station. In this scenario, the base station is wired to the gateway device 202 but the handsets communicate wirelessly with the base station. DECT phones are an example of this type of communication system. The gateway device 202 is set up to have a telephone number that is associated with a given home/gateway device. When calls are placed to this telephone number, the gateway device 202 routes the call to the landline device(s) 208. The user then communicates with the caller through the landline device(s) 208, the gateway device 202 and out through a wide area network to the caller.

In the techniques disclosed herein, when a user brings a mobile device 210 in range of the gateway device 202, the gateway device 202 detects the mobile device 210 and transfers calls directed at the mobile device 210 to the gateway device itself. This allows the mobile device calls to be received by the landline device(s) 208 in the home. Since a home typically has more landline device(s) 210 than mobile device(s) 210, this makes answering the call much more convenient. This is especially true when the mobile device(s) 210 is plugged into a power source for recharging.

In order for the gateway device 202 to transfer the calls to the mobile device(s) 210, it 202 first associates an identifier received from the mobile device(s) 210 with a telephone number associated with that particular device. This identifier can be, for example, a media access control (MAC) address. MAC addresses are typically unique to a given hardware device and, thus, can be used to identify a particular mobile device whether that device is a mobile phone, a laptop, a television set (some sets have communication capabilities) and/or a mobile tablet and the like. Once the MAC address is obtained, an association between the MAC address and a communication access number (e.g., telephone number) is established. This can be accomplished during initialization of the gateway device 202 by a user inputting their contact numbers and the like. It can also be done by prompting a user when a new MAC address is identified. The user can be asked whether or not this is a communication device with a communication access number. The user can then choose to not input a number or the user can input the associated communication access number into the gateway device 202. One convenient method of doing this is via a browser webpage 212. In this manner, the gateway device 202 provides a user interface for pairing the communication access numbers with a particular mobile device. The user interface can also give the user an opportunity to set when and/or if a communication access number should be used. This allows the user complete control over connections associated with the gateway device 202.

Once an association is made between the communication access number of the mobile device 210 and the gateway device 202, the gateway device 202 communicates the association to the service provider network 204 and on to the communication network 206. Calls directed to the mobile device 210 are then routed to the gateway device 202. This allows the gateway device 202 to direct the mobile device call to the landline device(s) 208. Now, the user can answer mobile calls on any landline device in the home 214. The phrase "in the home" includes the proximity of the home such as the immediate yard, patio, front porch, driveway and the like (most modern wireless base stations can transmit beyond the walls of the home).

Since the gateway 202 now controls where the mobile device call is transmitted, it 202 can also transmit additional information about the source of the call and the call itself. For example, a DECT phone that receives the mobile device call can be made to flash differently, ring differently (e.g., short rings, different melody, etc.) when a mobile call is received. This lets the user know that the call was originally directed to the mobile device 210 instead of the landline device 208. The mobile device communication contact number can also be displayed on the landline device 208 to make the user aware of the source of the call. In a similar fashion, additional information associated with the mobile device 210 can also be shown on the landline device 208. This can include, but is not limited to, displaying addresses and/or contact information from a database associated with the mobile device 210. The source of this information can come from an account associated with the mobile device on a remote server (e.g., from a "cloud" server) and the like. It can also be obtained by the gateway 202 from the mobile device 210 directly. This transfer of data can be controlled by the user when the connection from the mobile device 210 is programmed into the gateway 202 via a user interface.

With this new calling source availability, a hierarchy is typically needed for simultaneous and/or near simultaneous incoming calls. One option is to allow all calls received via the gateway 202 to be transferred to the landline device(s) 208. A display and/or other method can be used on the landline device(s) 208 to inform the user of multiple incoming calls. This can include, but is not limited to, a listing of the incoming calls that a caller can scroll through and select which call they would like to answer. The user can also initialize the gateway 202 with a priority list of calling sources. For example, the mobile device(s) 210 can have a higher priority than the landline device(s) 208. Thus, an incoming mobile device phone call can either be placed at a top of a list of incoming calls and/or it can override landline calls. In this example, the mobile device call can ring through and the landline call can be sent to voicemail (e.g., a display after the call can indicate to the user that the landline call went to voicemail) and the like. In another example, the user can limit the priority to certain times of the day. For example, mobile device calls received between 6 pm and 10 pm can have higher priority than landline calls.

A user might not desire to have their mobile device calls always forwarded when the mobile device 210 is within range of the gateway 202. Thus, the user can set up the gateway 202 to only transfer calls for devices allowed by the user and/or to only transfer calls given a certain set of circumstances. For example, if two or more mobile device(s) 210 are within range of the gateway 202, one of the mobile device(s) 210 can be given priority over another, not only in a listing hierarchy for received calls, but also overriding when the other device has its calls transferred by the gateway 202. This allows the gateway 202 to automatically select which mobile device 210 to transfer calls from based on user input but also on other parameters such as time of day, availability of user associated with the mobile device 210 and the like. If user A and user B both have mobile device(s) 210 in the home, but user B is absent from the home, user B's mobile device can be set by the gateway 210 to not transfer calls to the landline device(s) 208. In a similar fashion, if user A, user B and user C are at home, this can trigger the gateway 202 to not transfer calls from the mobile devices of user A and user B to the landline device(s) 208 (e.g., when a child is home, the parents will not answer their cell phones to allow more 'family time,' etc.). One skilled the art will appreciate the many different configurations, triggers, and/or parameters that can be employed by the gateway 202 in setting up transferred/synchronization calling between the mobile device(s) 210, the landline device(s) 208 and the gateway 202. The above examples are not intended to limit these possibilities in any manner.

Figure 3:
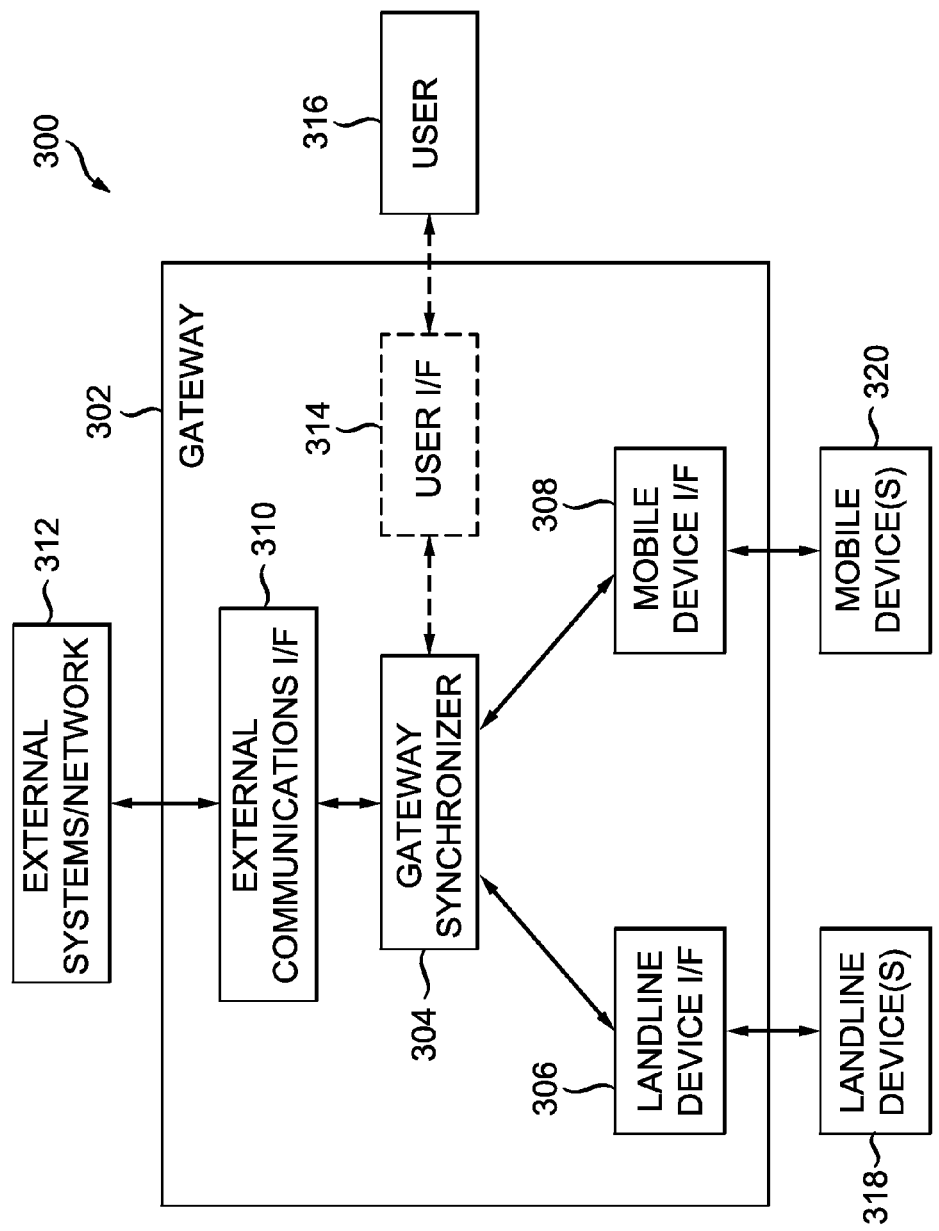
FIG. 3 is an example of a gateway that provides synchronization of contact numbers between a gateway and a mobile device.

An example of a system 300 of a gateway 302 that provides contact number synchronization is illustrated in FIG. 3. The gateway 302 includes a gateway synchronizer 304, a landline interface 306, a mobile device interface 308 and an external communications interface 310. The gateway 302 can also include an optional user interface 314 that allows for user input 316. The gateway synchronizer 304 obtains a contact number for a mobile device 320 through the mobile device interface 308. The mobile device interface 308 can include wired and/or wireless interfaces and the like. The interface 308 can be made through a docking station and the like as well as wired Ethernet. The most common connection is typically a WiFi connection and/or a Bluetooth connection. The contact number for the mobile device is a number that is dialed to reach the mobile device. This can include, but is not limited to, seven digit and/or 10 digit numbers which is common for the United States and/or longer/shorter numbers.

In a similar fashion, the gateway 302 has a contact number that is used to direct communications to that particular gateway. It can also vary in length. Once the gateway synchronizer 304 has identified the mobile device 320 and determined its contact number (e.g., through user input, directly from a mobile device, from a mobile device's ESN, etc.), it 304 synchronizes the mobile device contact number with the gateway contact number. This can be accomplished, for example, by relaying the mobile contact number and the gateway contact number via the external communications interface 310 to an external systems/network 312 like a communications network service provider. A request can be made of the communications network service provider to transfer calls for a particular ESN, a particular subscriber, and/or a particular mobile device contact number to the gateway contact number. A MAC address can also be used if the communications network service provider tracks that information for their subscribers. Thus, the gateway synchronizer 304 has many means of identifying the mobile device to the communications network service provider.

Once the mobile device 320 is synchronized to the gateway contact number, the gateway synchronizer 304 can control how, when and where the mobile device calls are directed to the landline device(s) 318. Many of these options are discussed in further detail herein. Additionally, the gateway synchronizer 304 can also obtain contact list information (e.g., phone numbers, addresses, names, etc.) that are associated with the mobile device 320. This information can come directly from the mobile device 320 and/or from a remote server used by the mobile device to store such information.

FIG. 4 is an example 400 of a communication device setup webpage 402 from a browser that has accessed a gateway. A gateway will typically have an Internet Protocol (IP) address associated with it. By typing that address into a browser, the gateway can be controlled through webpages generated by the gateway. In this example 400, a communication device setup with gateway webpage 402 has been accessed. This example 400 shows different options that can be set by a user to control the call transfer/synchronization between a mobile device and a gateway. In this example, box 404 allows the gateway to show what devices have been connected to the gateway. The user then has options regarding that connection. Here, MAC addresses 412 are used to uniquely identify each connected piece of hardware. The gateway can then inquire as to the device's communication number 414 and retrieve it automatically and/or if such is not a feature of the mobile device, a user can manually enter the number into the table. The user can then make the decision as to whether or not they want to associate 416 the mobile device number with a gateway number 418. The gateway can have more than one number (e.g., main number, roommate ring number, fax number, etc.) so the user can enter the desired gateway number and/or the gateway can automatically select a default gateway number. The user can also select a time period 420 for when they want the transfer/synchronization to occur. The mobile device can also be given a priority level 422 by the user and/or automatically by the gateway.

In box 406, a user can be given call answer options 424. In this example, the user has selected to send lower priority device calls to voicemail when a call conflict occurs. Conflicts in this scenario typically include timing of incoming call issues, call already taken issues, and/or calls blocked/silenced issues and the like. In the example, a user could have chosen to drop (not answer) calls and/or to move higher calls to the top of an incoming call list (e.g., "A" priority calls move to the top of the incoming call list, etc. rather than exactly the order the calls were received in). In box 408, a user has options pertaining to contact information from mobile devices. In this illustration, the user has selected to have contact information automatically transferred when a mobile device connects to the gateway and also to have the gateway seek contact information associated with the mobile device from a cloud source (e.g., a remote server that stores information for the mobile device). The user has also selected to have the gateway automatically transfer the information to landline devices. This will enable the user to refer to the contact information from any phone in the home or from selected phones.

In box 410, a user is given options for the webpage itself 428. In this scenario, the user has selected to always be given a prompt when new mobile devices are discovered by the gateway. The user has, however, declined to have the initial setup page show advanced options (e.g., additional options not shown in example 400). The user did select to password protect incoming calls from a mobile device. This allows the user to require a quick code (e.g., a series of numbers like 1-2-3-4) to be entered before the all can be answered. This maintains some privacy in the home for mobile device calls. For example, roommates might not want to share their mobile cell phone calls. A father might not want his mobile phone work calls answered by his two year-old child and the like. One skilled in the art can appreciate the many different controls and combinations of controls that can be utilized via the user interface.

Figure 5:
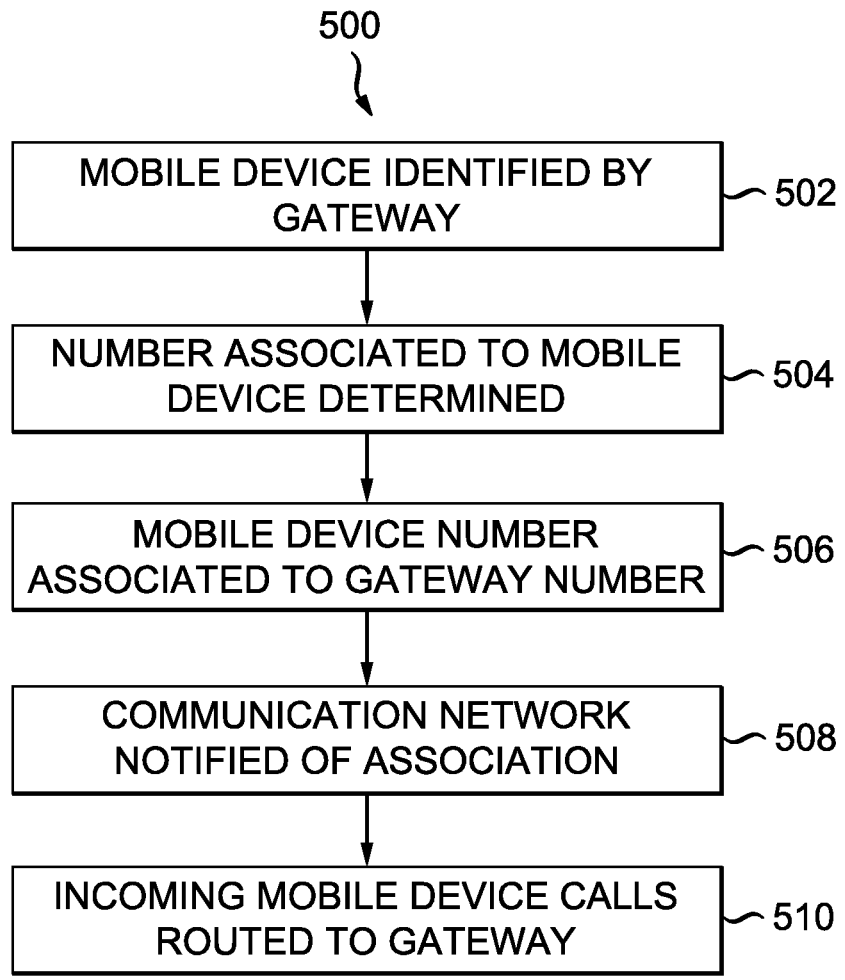
FIG. 5 is a flow diagram of a method of synchronizing a mobile device contact number with a gateway.

In view of the exemplary systems shown and described above, methodologies that can be implemented in accordance with the embodiments will be better appreciated with reference to the flow charts of FIG. 5. While, for purposes of simplicity of explanation, the methodologies are shown and described as a series of blocks, it is to be understood and appreciated that the embodiments are not limited by the order of the blocks, as some blocks can, in accordance with an embodiment, occur in different orders and/or concurrently with other blocks from that shown and described herein. Moreover, not all illustrated blocks may be required to implement the methodologies in accordance with the embodiments.

FIG. 5 is a flow diagram of a method 500 of synchronizing a mobile device contact number with a gateway. The method 500 starts with a gateway identifying a mobile device 502. The identification can be accomplished through a wireless means such as, for example, Bluetooth and/or WiFi and the like and/or through a wired means such as, for example, an Ethernet connection and/or a docking station connection and the like. Once a communication means is established, the gateway can either interrogate the mobile device for identification and/or it can obtain its MAC address to use in identifying the mobile device. Other identifications can be utilized as well-like obtaining a cell phone's electronic serial number (ESN). The ESN can be used by a gateway to obtain the telephone number associated with that mobile device from a communication network service provider. A communication number associated with the mobile device is then determined 504. This can include, but is not limited to, a user manually entering the communication number and/or the gateway automatically obtaining the communication number directly from the mobile device, from a communication network service provider and/or from some other source such as a lookup table that is locally and/or remotely stored.

The gateway then associates its communication number with the mobile device communication number 506. This can be a default number used by the gateway that is paired with the mobile device number. It can also be associated with a gateway number by a user. Once, the association is completed, the gateway notifies a communication network related to the mobile device to route calls to the mobile device to the gateway communication number 508. When the communication network receives a subsequent call for the mobile device, it will then be routed to the gateway 510. The gateway can then select to immediately route the call to a landline device associated with the gateway and/or delay the incoming calls and the like. The gateway can also access user selected options to determine how to handle the incoming calls for the mobile device. Examples of the different options have been disclosed above.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system that transfers calls via a gateway, comprising:
a local device interface of the gateway that interfaces with local devices;
a mobile device interface of the gateway that interfaces with mobile devices; and
a gateway synchronizer that obtains contact information for a mobile device through the mobile device interface, associates the mobile device contact information with gateway contact information, communicates mobile device contact information and gateway contact information to a communication network provider associated with the mobile device so that calls for the mobile device are routed by the communication network provider to the gateway device and then routed by the gateway synchronizer to a local device.

2. The system of claim 1, further including:
a user interface that provides control of the gateway synchronizer, the user interface interacting between the gateway synchronizer and a user.

3. The system of claim 2, wherein the user interface provides at least one of a means to associate gateway information and mobile information, a means to enter mobile device information, a means to set a time period, and a means to set a priority.

4. The system of claim 2, wherein the user interface is further configured to determine a priority list to be used by the gateway in case of simultaneous incoming calls.

5. The system of claim 1, wherein the gateway synchronizer identifies a mobile device by at least one of its media access control address and its electronic serial number.

6. The system of claim 1, wherein the gateway synchronizer obtains information from a mobile device and relays the information to the local device.

7. The system of claim 6, wherein the information includes a contact information list.

8. The system of claim 1, wherein the gateway synchronizer obtains information associated with a mobile device from a remote server.

9. The system of claim 1, wherein the interface between the gateway and the local devices is using DECT and the local device is a DECT phone.

10. The system of claim 9, wherein the DECT phone rings differently when a mobile call is received.

11. The system of claim 1, wherein the interface between the gateway and the mobile devices is using Bluetooth or WiFi.

12. The system of claim 1, wherein, in case of incoming call, the gateway synchronizer transmits information about the source of the call to the local device and the local device displays the information.

13. A method for transferring calls via a gateway, comprising:
obtaining a contact information for a mobile device;
associating the mobile device contact information and gateway contact information;
relaying the mobile device contact information and the gateway contact information to a communications network service provider associated with the mobile device that will route the calls to the mobile device to the gateway; and
upon reception of incoming calls for the mobile device by the gateway, route these calls to a local device connected to the gateway.

14. The method of claim 13, wherein obtaining the contact information further comprises:
determining that the mobile device is within range of the gateway;
requesting identification from the mobile device; and
relating the identification of the mobile device with the contact information for the mobile device.

15. The method of claim 13, further comprising:
accepting user input via a user interface provided by the gateway to allow control of mobile device calls.

16. The method of claim 13, wherein directing incoming calls further comprises:
sending notifications to the local device to indicate a mobile device call.

17. The method of claim 13, wherein directing incoming calls further comprises:
requiring a security measure be surpassed before allowing a mobile device call to be received on the local device.

18. The method of claim 13, further comprising:

obtaining contact list information related to the mobile device; and relaying the contact list information via the gateway to the local device.

19. A system that relays mobile device calls via a gateway, comprising:

a device for obtaining contact information for a mobile device within range of the gateway;

a device for associating the obtained contact information with contact information for the gateway;

a device for relaying the contact information for the mobile device and the contact information for the gateway to a communications network service provider associated with the mobile device so that calls for the mobile device are routed to the gateway; and a device for transferring incoming calls for the mobile device to a local device connected to the gateway.

20. The system of claim 19 further comprising:

a device for relaying contact list information associated with the mobile device to the local device via the gateway.

\* \* \* \* \*